United States Patent
Ichimaru (10) Patent No.: US 6,507,976 B2
(45) Date of Patent: Jan. 21, 2003

(54) DAMPER DEVICE

(75) Inventor: Takahide Ichimaru, Sagamihara (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 09/885,533

(22) Filed: Jun. 21, 2001

(65) Prior Publication Data

US 2002/0003993 A1 Jan. 10, 2002

(30) Foreign Application Priority Data

Jul. 6, 2000 (JP) .......................... 2000-204584

(51) Int. Cl.$^7$ .................................................. E05F 5/02
(52) U.S. Cl. ........................ 16/82; 16/85; 16/86 R; 16/2.1; 248/188.4
(58) Field of Search .......................... 16/82, 85, 86 R, 16/86 A, 2.1; 248/188.4, 410, 411; 411/383, 384, 535, 182, 349, 549, 550, 551; 180/69.21, 89.17; 292/DIG. 14

(56) References Cited

U.S. PATENT DOCUMENTS

| 4,653,968 A | * | 3/1987 | Rapata et al. .................. 16/19 |
| 5,092,550 A | * | 3/1992 | Bettini .................... 248/188.4 |
| 5,193,961 A | * | 3/1993 | Hoyle et al. .................. 24/297 |
| 5,314,280 A | * | 5/1994 | Gagliardi et al. ........ 29/525.02 |
| 5,482,348 A | | 1/1996 | Mass et al. |
| 5,735,511 A | | 4/1998 | Stoecker et al. |
| 6,088,878 A | | 7/2000 | Antonucci et al. |
| 6,119,306 A | | 9/2000 | Antonucci et al. |
| 6,261,042 B1 | * | 7/2001 | Pratt .......................... 411/551 |

FOREIGN PATENT DOCUMENTS

| EP | 1 103 689 | | 5/2001 |
| FR | 2 565 649 | | 12/1985 |
| JP | 4-70480 | * | 3/1992 |
| JP | 7-49056 | | 11/1995 |
| JP | 9-15075 | * | 6/1997 |
| JP | 2000-9165 | * | 1/2000 |

* cited by examiner

Primary Examiner—Chuck Y. Mah
(74) Attorney, Agent, or Firm—Kanesaka & Takeuchi (57) ABSTRACT

A damper device includes a damper main body, and a grommet fixed to a fixing member. The damper main body includes a shaft portion having a plurality of engagement projection portions extending along a peripheral direction at predetermined intervals in an axial direction thereof. The grommet has a tube portion, an engaging device to be fixed to the fixing member formed outside the tube portion, and an elastic anchor piece disposed inside the tube portion to engage the engagement projection portions of the shaft portion pressed into the tube portion. When a stopper is formed outside the shaft portion and tightened to the grommet, the damper main body can be securely fixed to the grommet.

4 Claims, 7 Drawing Sheets

DAMPER DEVICE

BACKGROUND OF THE INVENTION AND RELATED ART STATEMENT

The present invention relates to a damper device which is used as an abutment stopping member for adjusting a closed position of, for example, a hood, a trunk cover, a door, or the like of a vehicle.

The above-described damper device abuts against a hood, a trunk cover, or a door which is closed, for stopping the same, and in order to make the line of the hood, trunk cover, or door which is closed correspond with the body line, it is used to adjust the height of the closed hood or trunk cover, or adjust the position of the closed door. The damper device is formed by a damper main body which is cylindrical and at whose outer periphery a male screw is formed, and a grommet at which a female screw, which engages the male screw of the damper main body, is formed and which is mounted to a member to be mounted to.

Next, the mounting of the damper device will be explained.

First, by using a mounting hole provided at a predetermined position of a vehicle body, the grommet is mounted to the hole of the vehicle body. Then, the damper device is mounted to the vehicle body by screwing the male screw of the damper main body with the female screw of the grommet so as to mount the damper main body to the grommet.

Next, adjustment of the projecting length of the damper main body which projects from the grommet will be described.

First, in case the projecting length of the damper main body is long, i.e., in case the line of the hood projects outwardly above the body line, the damper main body is rotated and is screwed further with respect to the grommet such that the screwed length of the female screw with respect to the male screw, i.e., the screwed length of the grommet with the damper main body, becomes longer. In this way, the projecting length of the damper main body from the grommet is made shorter.

Further, in case the projecting length of the damper main body is short, i.e., in case the line of the hood is lower than the body line, the damper main body is rotated and the screwing of the damper main body with the grommet is adjusted such that the screwed length of the grommet with the damper main body becomes shorter. By making the screwed length shorter, the projecting length of the damper main body from the grommet becomes longer.

In this way, by rotating the damper main body with respect to the grommet, the projecting length of the damper main body from the grommet is adjusted to a predetermined length, so that the body line and the line of the hood match. The body line and the line of the hood can thereby be made to match each other.

Note that such a damper device is disclosed in, for example, Japanese Utility Model Publication (KOKOKU) No. 7-4905.

In this conventional damper device, in case the projecting length of the damper main body from the grommet is to be adjusted, the gap (difference in heights) between the body line and the line of the hood is measured. On the basis of this gap, the projecting length of the damper main body is adjusted by visual estimation. Thus, the projecting length of the damper main body must be adjusted two or three times until the gap between the body line and the line of the hood is eliminated, and thus, work efficiency is poor.

The present invention has been developed in order to overcome the above-described drawbacks, and an object of the present invention is to provide a damper device which enables the projecting length of a damper main body to be adjusted and set to a desired length easily and with good work efficiency.

Further objects and advantages of the invention will be apparent from the following description of the invention

SUMMARY OF THE INVENTION

A damper device relating to the present invention comprises: a damper main body having a shaft portion at which a plurality of engagement projection portions, which extend along a peripheral direction, is provided at predetermined intervals in an axial direction; and a grommet in which an outwardly-extending flange is provided at one end of a tube portion, and an elastic nipping piece which, together with the flange, nips a member to be mounted is provided at the tube portion. Also, an elastic anchor piece, which engages the engagement projection portions of the shaft portion to be pressed into the tube portion from a flange side, is provided at the tube portion.

It is desirable that the engagement projection portions are provided at one end portion of the shaft portion, and a male screw is provided at the shaft portion at a side away from the engagement projection portions. Also, the damper device includes a stopper which engaging the male screw, and by rotating the stopper with respect to the shaft portion and making the stopper abut against the flange, a projecting length of the damper main body projecting from the grommet is fixed.

It is also desirable that the damper device further comprises an abutment projection which extends in an axial direction at a portion where the engagement projection portions are provided, and which abuts against the elastic anchor piece.

In a damper device in another aspect of the invention, by screwing a male screw of a damper main body with respect to a female screw so as to change a screwed length, a projecting length of the damper main body projecting from a member at which the female screw is provided is adjusted. Projecting length change amount indicting means is provided at at least one of the damper main body and the member. The projecting length change amount indicating means indicates a rate by which the projecting length of the damper main body changes due to the rotation of the damper main body such that the screwed length of the male screw and the female screw is changed.

DETAILED DESCRIPTION OF PREFERRED EMBODIMENTS

Hereinafter, embodiments of the present invention will be described on the basis of the drawings.

Figure 1:
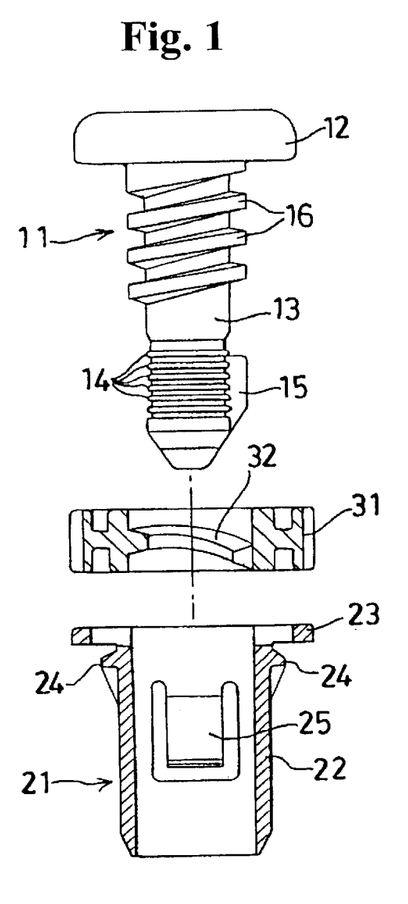
FIG. 1 is an exploded front view, a portion of which is in cross-section, of a damper device which is an embodiment of the present invention.
Figure 2:
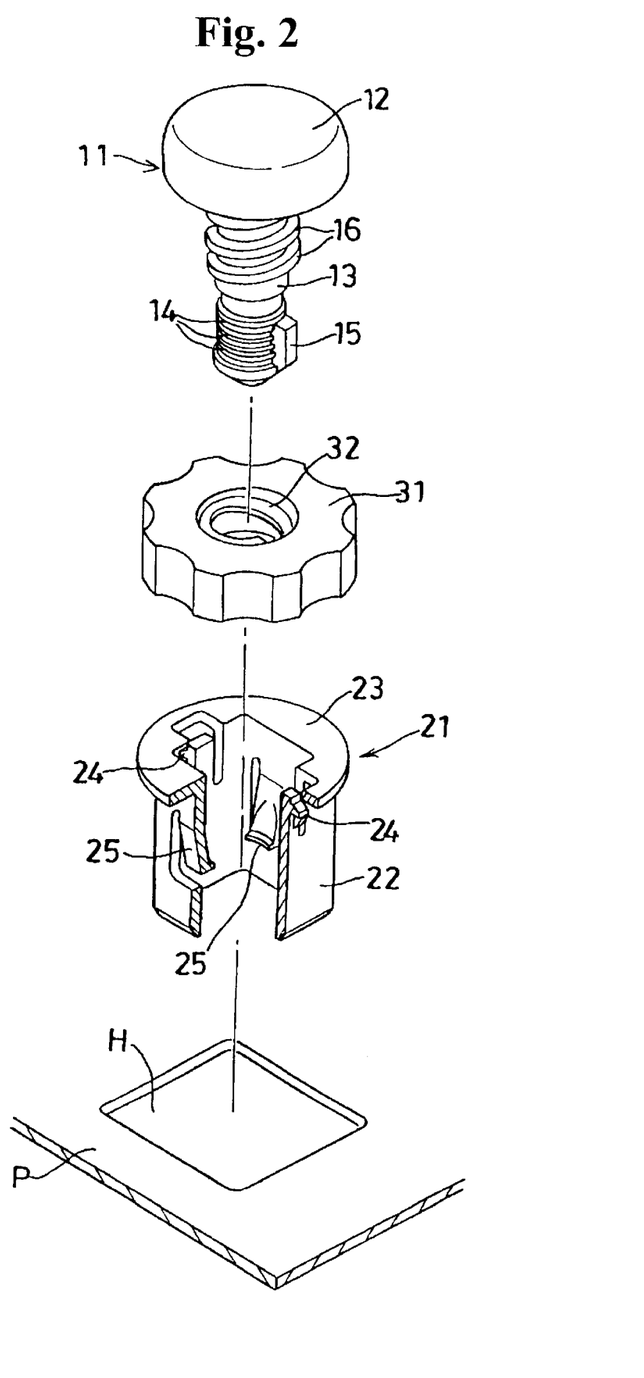
FIG. 2 is a partially cutaway exploded perspective view of the damper device shown in FIG. 1.
Figure 3:
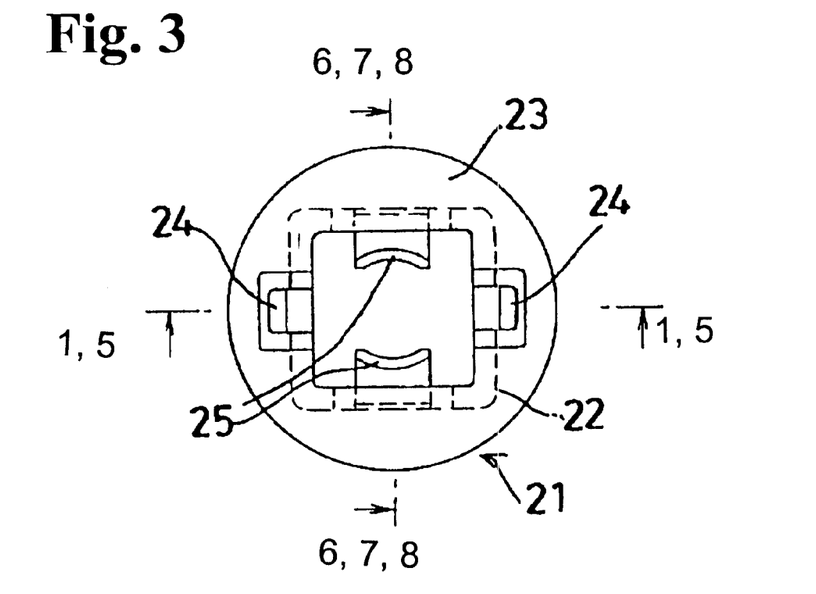
FIG. 3 is a plan view of a grommet shown in FIG. 1.
Figure 4:
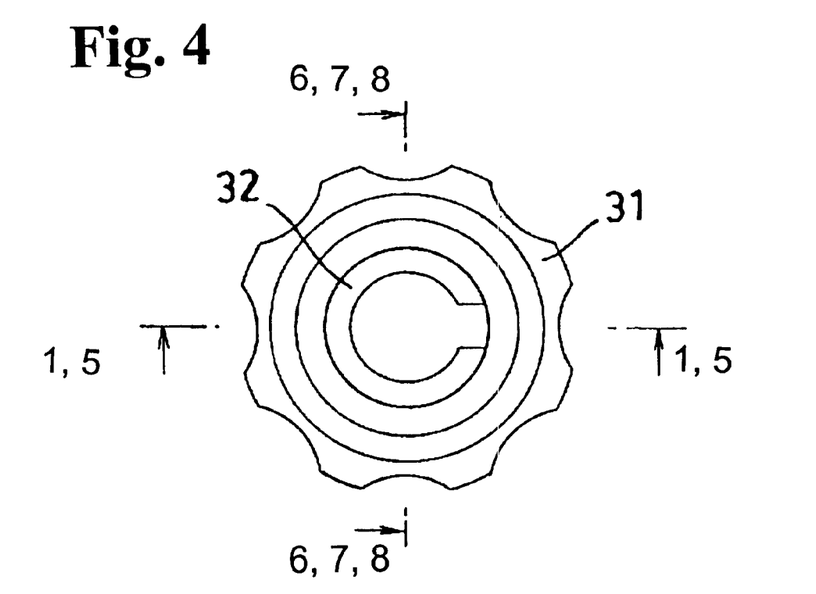
FIG. 4 is a plan view of a stopper shown in FIG. 1.

FIG. 1 is an exploded front view, a portion of which is in cross-section, of a damper device which is an embodiment of the present invention. FIG. 2 is a partially cutaway exploded perspective view of the damper device shown in FIG. 1. FIG. 3 is a plan view of a grommet shown in FIG. 1, and FIG. 4 is a plan view of a stopper shown in FIG. 1. FIGS. 5 through 8 are explanatory views showing a way of mounting the damper device, which is an embodiment of the present invention, to a panel, and a way of adjusting a projecting length of a damper main body, and a way of fixing the projecting length of the damper main body.

Figure 5:
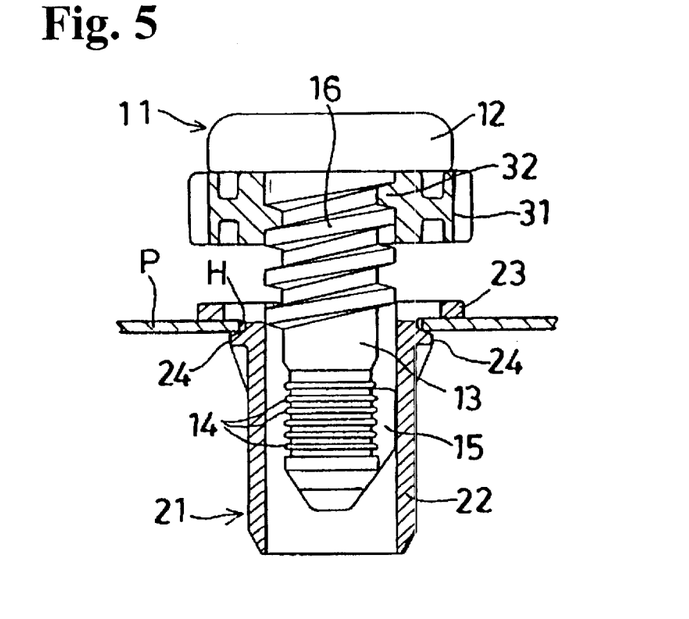
FIG. 5 is an explanatory view showing a state in which the damper device, which is an embodiment of the present invention, is mounted to a panel.

The cross-sections of the grommet in FIGS. 1 and 5 correspond to line 1,5—1,5 of FIG. 3, and the cross-sections of the stopper in FIGS. 1 and 5 correspond to line 1,5—1,5 of FIG. 4. The cross-sections of the grommet of FIGS. 6 through 8 correspond to line 6,7,8—6,7,8 of FIG. 3, and the cross-sections of the stopper of FIGS. 6 through 8 correspond to line 6,7,8—6,7,8 of FIG. 4.

In the drawings, numeral 11 denotes a damper main body formed of rubber. The damper main body 11 is formed by a head portion 12 which is disc-shaped, and a shaft portion 13 which is formed integrally with the head portion 12 and extends downward from the center of the bottom surface of the head portion 12.

A plurality of engagement projection portions 14, which encircle the shaft portion 13 in a direction orthogonal to the axial direction, is provided at the lower side of the shaft portion 13 so as to be spaced apart at predetermined intervals in the axial direction. An abutment projection 15, which extends in the axial direction and abuts against an elastic anchor piece 25 which will be described later, is provided at the portion where the engagement projection portions 14 are disposed. Further, a male screw 16 is formed at a region above the engagement projection portions 14 and the abutment projection 15.

The outer diameter of the engagement projection portions 14 corresponds to the inner diameter of the male screw 16. The height of the abutment projection 15 corresponds to the outer diameter of the male screw 16.

Numeral 21 denotes a grommet which is formed of a synthetic resin. The grommet 21 is formed by a tube portion 22 which is rectangular in a plan view, a flange 23 which is formed continuously with the upper end (one end) of the tube portion 22 so as to surround the upper end and extend outwardly, two elastic nipping pieces 24 which are formed at opposing positions of the tube portion 22 such that a panel or member P to be mounted is nipped by the elastic nipping pieces 24 and the flange 23, and the two elastic anchor pieces 25 which are formed at opposing positions of the tube portion 22 and extend inwardly from the flange 23 side toward the bottom end (other end) side.

The interval between the distal ends (lower ends) of the elastic anchor pieces 25 is narrower than the width of the engagement projection portions 14.

Numeral 31 denotes a stopper which is formed of synthetic resin and is molded in a disc-shape. A female screw 32, which screws with the male screw 16, is provided at the stopper 31. A portion of the female screw 32 is cut-away in the axial direction so that the abutment projection 15 can be inserted therethrough. P denotes the panel which serves as the member to be mounted. A rectangular mounting hole H, into which the tube portion 22 can be inserted, is formed in the panel P.

Next, an example of mounting the damper device will be described.

First, the lower side of the tube portion 22 is located to correspond to the mounting hole H and the grommet 21 is pressed toward the panel P. Thus, the elastic nipping pieces 24, portions of which project from the outer periphery of the tube portion 22, are pushed by the edge of the panel P so as to be deflected inwardly.

Then, when the elastic nipping pieces 24 pass through the panel P and the flange 23 abuts against the upper side of the panel P, the elastic nipping pieces 24 return to their original states due to the elasticity thereof, and abuts against the lower side of the panel P. As shown in FIG. 5, because the panel P is nipped by the flange 23 and the elastic nipping pieces 24, the tube portion 22 is mounted to the panel P.

Figure 6:
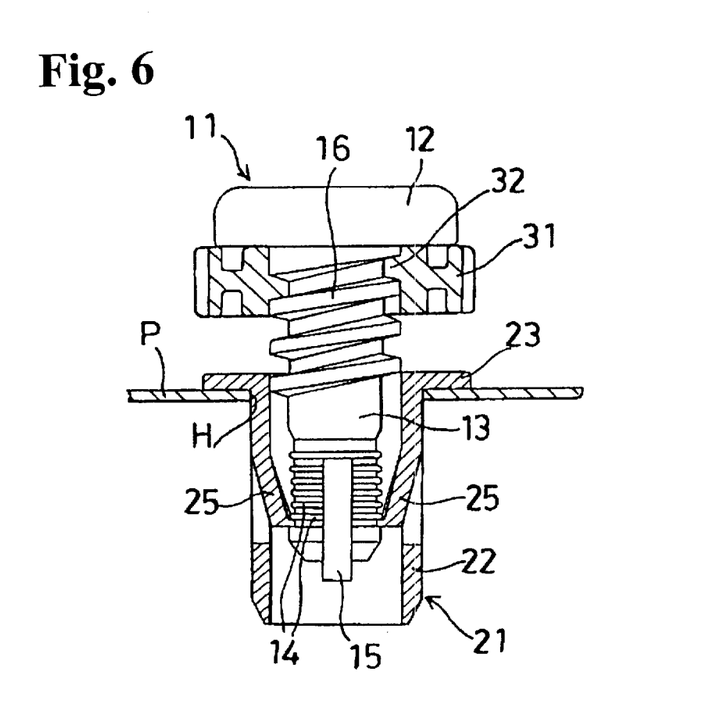
FIG. 6 is an explanatory view showing a state in which the damper device, which is an embodiment of the present invention, is mounted to the panel.

Next, the lower side of the shaft portion 13 is inserted in the stopper 31, the male screw 16 is screwed together with the female screw 32, and the stopper 31 is turned to abut against the lower surface of the head portion 12. Thereafter, the abutment projection 15 is located at a position which is offset from the elastic anchor pieces 25, and the lower side of the shaft portion 13 is inserted into the tube portion 22 from the side of the flange 23, and is press-fitted between the elastic anchor pieces 25. As shown in FIGS. 5 and 6, the elastic anchor pieces 25 are engaged with the lower side portion of the engagement projection portion 14 such that the shaft portion 13 is nipped by the elastic anchor pieces 25, and the projecting length of the damper main body 11 from the grommet 21 becomes substantially a maximum. In this way, the mounting of the damper device is completed.

Incidentally, after the damper device has been assembled as shown in FIGS. 5 and 6, the damper device may be mounted to the panel P.

Next, the adjustment of the projecting length of the damper main body 11 and the fixing of the projecting length will be described.

Figure 7:
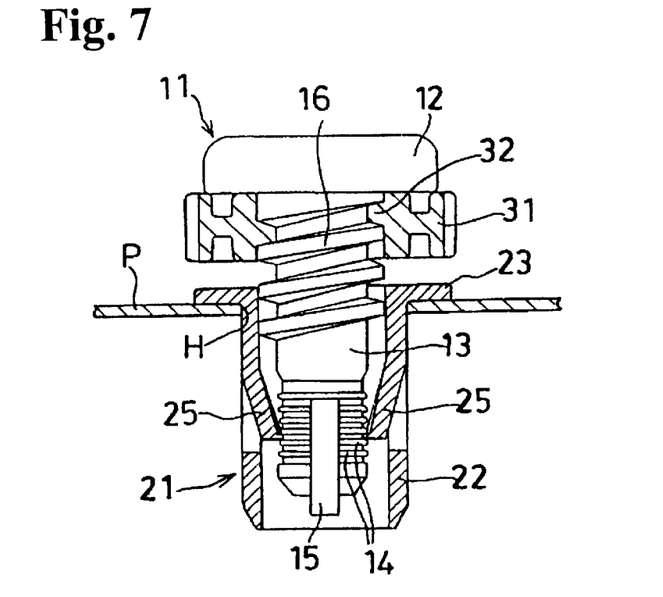
FIG. 7 is an explanatory view showing an adjustment of a projecting length of a damper main body at the damper device which is an embodiment of the present invention.

First, for example, a hood (not shown) is slowly lowered and closed from above the damper main body 11 which is in the state shown in FIGS. 5 and 6. When the line of the hood corresponds to the body line, as shown in FIG. 7, the damper main body 11 is pressed by the hood and is lowered to a predetermined position. In this way, a predetermined number of engagement projection portions 14 ride-over the elastic anchor pieces 25 while causing the elastic anchor pieces 25 to open outwardly. Because the engagement projection portion 14 at the position at which the body line and the hood line match is engaged with the elastic anchor pieces 25, the projecting length of the damper main body 11 can be adjusted at a single time without rotating the damper main body 11.

Figure 8:
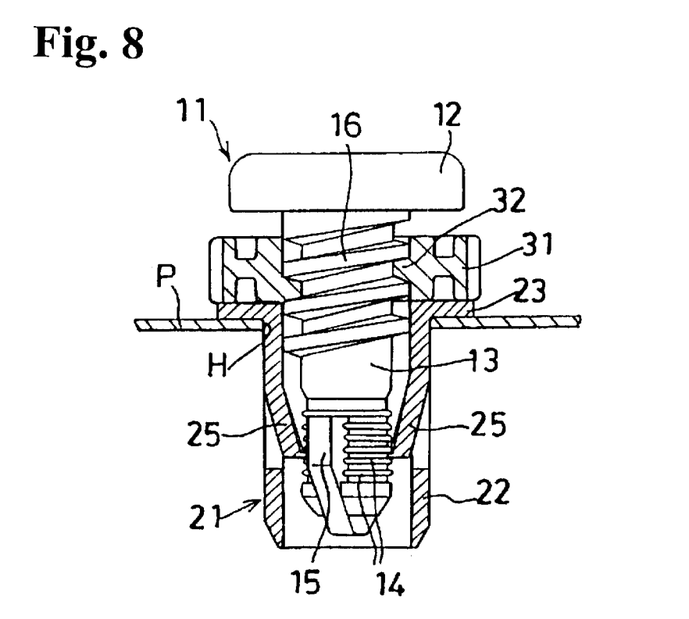
FIG. 8 is an explanatory view showing a fixing state of the projecting length of the damper main body at the damper device which is an embodiment of the present invention.

Then, when the hood is opened and the stopper 31 is rotated with respect to the damper main body 11 so as to be lowered, as shown in FIG. 8, the damper main body 11 slightly rotates together with the stopper 31. However, due to the abutment projection 15 abutting against the elastic anchor piece 25, only the stopper 31 rotates, and as shown in FIG. 8, the stopper 31 can abut (pressure-contact) against the flange 23.

When the stopper 31 abuts against the flange 23, the damper main body 11 can not be lowered any further, and thus, the projecting length of the damper main body 11 is fixed.

As described above, in accordance with the embodiment of the present invention, the elastic anchor pieces 25 can engage the engagement projection portion 14, and the projecting length of the damper main body 11 from the grommet 21 is maintained. Thus, in a state in which the projecting length of the damper main body 11 from the grommet 21 is substantially a maximum, by merely pushing the damper main body 11 into the grommet 21, the projecting length of the damper main body 11 can be adjusted and set to a desired length at a single time easily and with good work efficiency and without rotating the damper main body 11.

The male screw 16 is provided at the shaft portion 13, and the stopper 31, which screws with the male screw 16, is provided. Thus, by rotating the stopper 31 with respect to the shaft portion 13 and making the grommet 21 abut against the flange 23, the projecting length of the damper main body 11 which projects from the grommet 21 can be fixed so as not to change.

Because the abutment projection 15, against which the elastic anchor piece 25 abuts, is provided at the region where the engagement projection portions 14 are provided, due to the abutment projection 15 abutting against the elastic anchor piece 25, it is possible to rotate only the stopper 31. Thus, the stopper 31 can be rotated with a single hand, and the projecting length of the damper main body 11 projecting from the grommet 21 can be fixed with good workability by a single hand.

Figure 9:
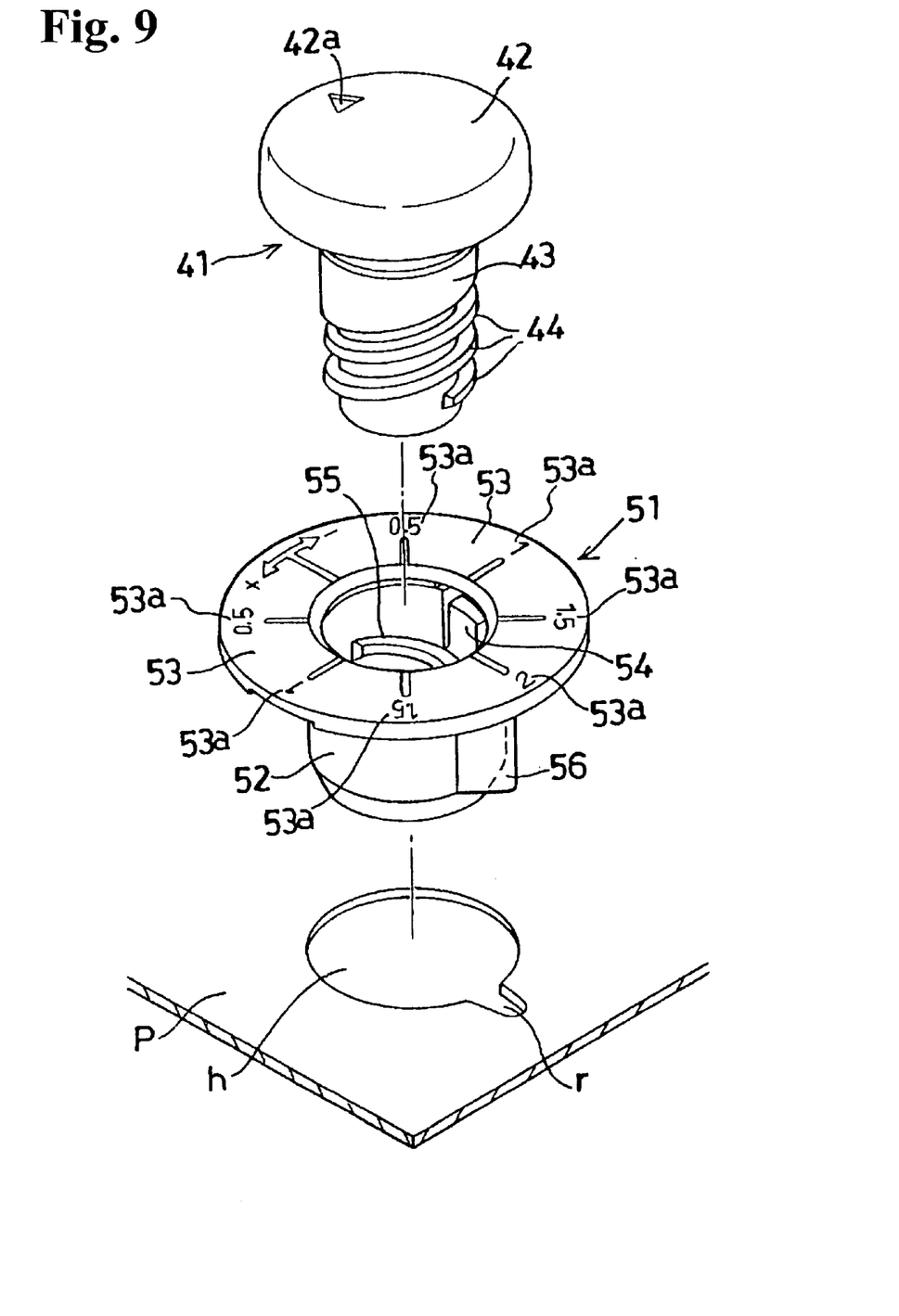
FIG. 9 is an exploded perspective view of a damper device which is a different embodiment of the present invention.
Figure 10:
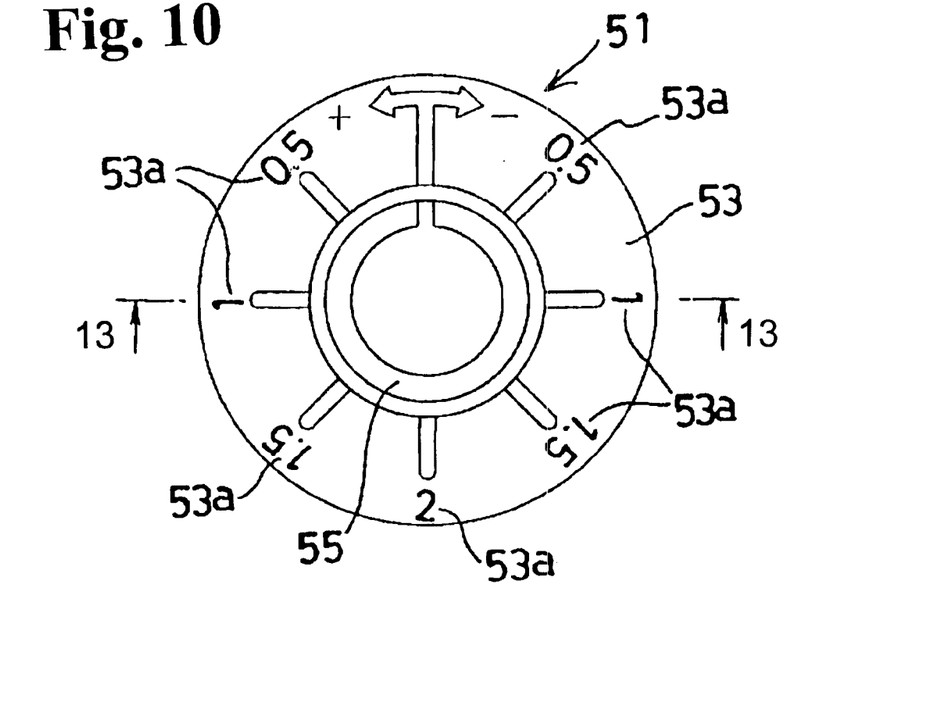
FIG. 10 is a plan view of a grommet shown in FIG. 9.
Figure 11:
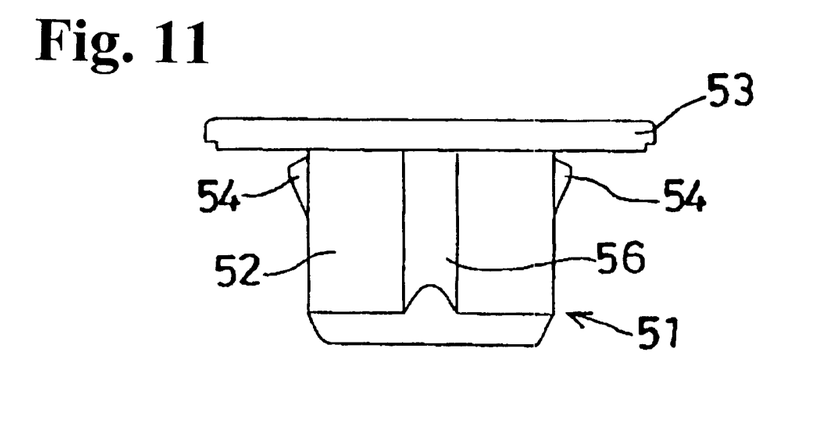
FIG. 11 is a front view of the grommet shown in FIG. 9.
Figure 12:
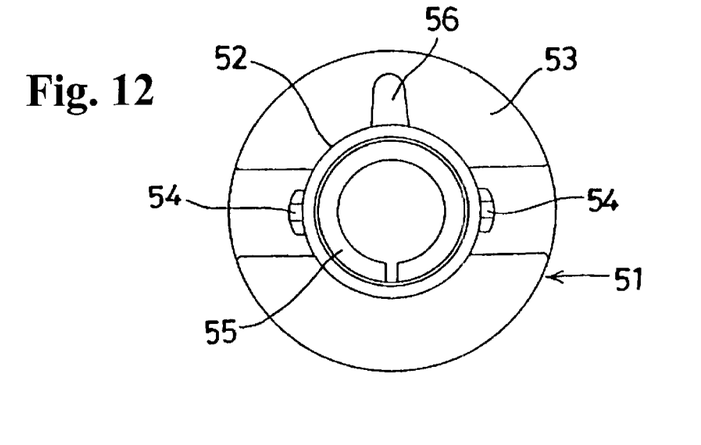
FIG. 12 is a bottom view of the grommet shown in FIG. 9.
Figure 13:
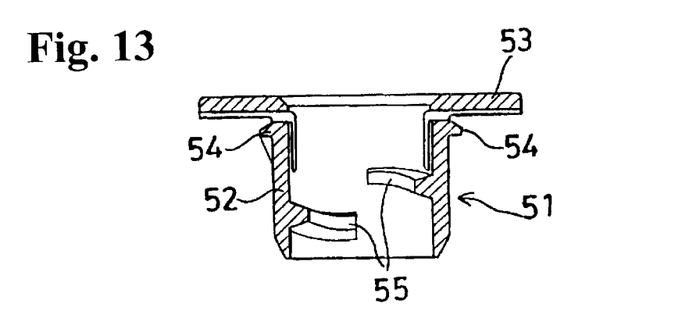
FIG. 13 is a cross-sectional view taken along line 13—13 of FIG. 10.
Figure 14:
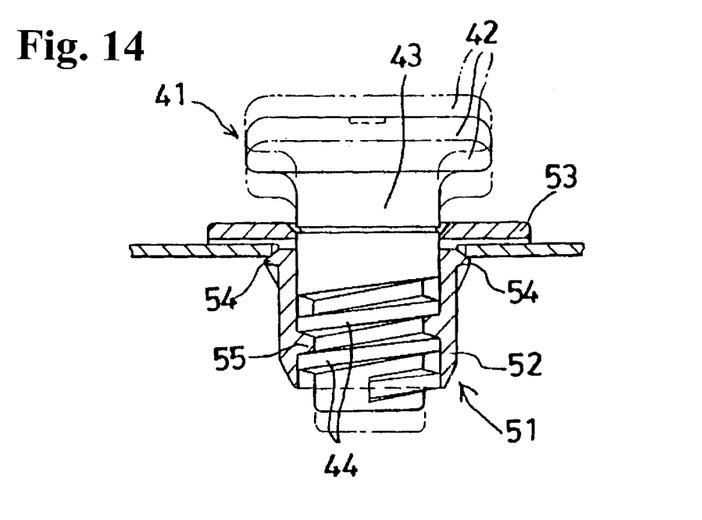
FIG. 14 is an explanatory view showing a way of mounting the damper device, which is the different embodiment of the present invention, to a panel, and a way of adjusting a projecting length of a damper main body.

FIG. 9 is an exploded perspective view of a damper device which is another embodiment of the present invention. FIG. 10 is a plan view of a grommet shown in FIG. 9. FIG. 11 is a front view of the grommet shown in FIG. 9, and FIG. 12 is a bottom view of the grommet shown in FIG. 9. FIG. 13 is a cross-sectional view taken along line 13—13 of FIG. 10. FIG. 14 is an explanatory view showing a way of mounting the damper device, which is the another embodiment of the present invention, to a panel, and a way of adjusting a projecting length of a damper main body.

In the drawings, numeral 41 denotes a damper main body formed of rubber. The damper main body 41 is formed by a head portion 42 which is disc-shaped, and a shaft portion 43 which is formed integrally with the head portion 42 and extends downward from the center of the bottom surface of the head portion 42. An indication mark 42a, which is shaped as an isosceles triangle and points toward a radially outer side, is provided at the periphery of the upper surface of the head portion 42. A male screw 44 is provided at the shaft portion 43 from the lower end to the upper end side thereof.

Numeral 51 denotes a grommet which is formed of synthetic resin. The grommet 51 is formed by a tube portion 52 which is circular in a plan view, a flange 53 which is formed continuously with the upper end (one end) of the tube portion 52 so as to surround the upper end and extend outwardly, two elastic nipping pieces 54 which are formed at opposing positions of the tube portion 52 such that the panel P is nipped by the elastic nipping pieces 54 and the flange 53, and a female screw 55 formed at the inner side of the tube portion 52 formed integrally therewith.

A detent projection 56 is formed continuously along the axial direction at the outer peripheral surface of the tube portion 52. The detent projection 56 functions as a detent for the grommet 51 by engaging a projected hole r of the panel P.

Graduations 53a are formed on the upper surface (the surface at the side opposite to the tube portion 52) of the flange 53. The graduations 53a indicate how many millimeters the projecting length changes by rotating the damper main body 41 by 45°, due to the pitch of the male screw 44 and the female screw 55. In the present embodiment, the graduations 53a show that the projecting length changes by 0.5 mm by rotating the damper main body 41 by 45°.

P denotes the panel as the member to be mounted. A mounting hole h which is circular and into which the tube portion 52 can be fit, and the projected hole r which extends in the radial direction of the mounting hole h, are formed in the panel P.

Next, an example of mounting the damper device will be described.

First, the lower side of the tube portion 52 is placed to coincide with the mounting hole h, and the detent projection 56 is arranged to coincide with the projected hole r. Then, the grommet 51 is pushed toward the panel P. Thus, the elastic nipping pieces 54, top portions of which project from the outer periphery of the tube portion 52, are pushed by the edge of the panel P so as to be deflected inwardly.

Then, when the elastic nipping pieces 54 pass through the panel P and the flange 53 abuts against the upper side of the panel P, the elastic nipping pieces 54 return to their original states due to the elasticity thereof and abut against the lower side of the panel P. As shown in FIG. 14, because the panel P is nipped by the flange 53 and the elastic nipping pieces 54, the tube portion 52 is mounted to the panel P.

Then, the damper main body 41 is screwed into the grommet 51. When the damper device is mounted in this way, the indication mark 42a of the damper main body 41 is made to match the graduation 53a.

Next, adjustment of the projecting length of the damper main body 41 will be described.

First, a hood (not shown) is lowered by being closed, and the gap (difference in heights) between the body line and the line of the hood is measured. Then, if the line of the hood is higher than the body line, i.e., if the hood projects out from the body, the hood is opened, and in order to make the projecting length of the damper main body 41 shorter, the damper main body 41 is rotated in the clockwise direction (the direction in which the screwed length of the male screw 44 and the female screw 55 becomes longer) by an angle which corresponds to the measured value. For example, if the measured value is 2.0 mm, the damper main body 41 is rotated by 180°. By setting the indication mark 42a to correspond to the graduation 53a which is "2", adjustment of the projecting length of the damper main body 41 is completed.

When the line of the hood is lower than the body line, i.e., when the hood is concave with respect to the body, the hood is opened, and in order to make the projecting length of the damper main body 41 longer, the damper main body 41 is rotated in the counterclockwise direction (the direction in which the screwed length of the male screw 44 and the female screw 55 becomes shorter) by an angle which corresponds to the measured value. For example, if the measured value is 1.5 mm, the damper main body 41 is rotated by 135°. By setting the indication mark 42a to correspond to the graduation 53a which is "1.5", adjustment of the projecting length of the damper main body 41 is completed.

As described above, in accordance with this embodiment of the present invention, a projecting length change amount indicting means (the indication mark 42a and the graduations 53), which shows the rate by which the projecting length of the damper main body 41 changes, is provided at the damper main body 41 and the flange 53. Thus, by rotating the damper main body 41 with respect to the grommet 51 while watching the projecting length change amount indicating means, the projecting length of the damper main body 41 can be adjusted and set to the desired length simply and with good work efficiency.

In the above embodiments, the head portions 12, 42 are provided at the damper main bodies 11, 41. However, the same functions are achieved even if the head portions 12, 42 are not provided. When the head portion 42 is not provided, the same functions can be achieved if the graduations forming the projecting length change amount indicating means are provided at the periphery of the top surface of the shaft portion 13. The graduations 53a which form the projecting length change amount indicating means are provided at the flange 53. However, the grommet 51 can be omitted by providing the female screw at the panel P by tapping and providing the graduations at the panel P.

Further, the projecting length change amount indicating means is formed by the indication mark 42a and the graduations 53a. However, even if the projecting length change amount indicating means is formed only by the indication mark or only by the graduations, and this projecting length change amount indicating means is provided at the damper main body or at the member at which the female screw is provided, the projecting length of the damper main body can be adjusted by rotating the damper main body while watching the projecting length change amount indicating means.

As described above, in accordance with the present invention, the projecting length of the damper main body from the grommet is maintained by the elastic anchor pieces engaging the engagement projection portion. Thus, in a state in which the projecting length of the damper main body from the grommet is substantially a maximum, by merely pushing the damper main body into the grommet, the projecting length of the damper main body can be adjusted and set to the desired length at a single time, simply and with good work efficiency and without rotating the damper main body.

Further, the male screw is provided at the shaft portion, and the stopper, which screws with the male screw, is provided. Thus, by rotating the stopper with respect to the shaft portion and making the stopper abut against the flange of the grommet, the projecting length of the damper main body projecting from the grommet can be fixed such that it does not change.

The abutment projection, against which the elastic anchor piece abuts, is provided at the portion where the engagement projection portions are provided. Thus, by making the abutment projection abut against the elastic anchor piece, only the stopper can be rotated. Thus, by rotating the stopper with one hand, the projecting length of the damper main body projecting from the grommet can be fixed with good workability.

Further, in accordance with the other invention, the projecting length change amount indicating means, which shows the rate by which the projecting length of the damper main body changes, is provided at the damper main body and the member. Thus, by rotating the damper main body with respect to the member while watching the projecting length change amount indicating means, the projecting length of the damper main body can be adjusted and set to the desired length simply and with good work efficiency.

While the invention has been explained with reference to the specific embodiments of the invention, the explanation is illustrative and the invention is limited only by the appended claims.

What is claimed is:

1. A damper device comprising:

a damper main body including a shaft portion having a plurality of engagement projection portions extending along a peripheral direction at predetermined intervals in an axial direction thereof;

a grommet having a tube portion, engaging means to be fixed to a fixing member formed outside the tube portion, and an elastic anchor piece disposed inside the tube portion to engage the engagement projection portions of the shaft portion pressed into the tube portion; and a stopper engaging the shaft portion and moving in the axial direction thereof, said stopper abutting against the grommet through the shaft portion to fix the damper main body to the grommet.

2. A damper device according to claim 1, wherein said engaging means includes an outwardly-extending flange provided at one end of the tube portion, and an elastic nipping piece formed outside the tube portion for nipping the fixing member together with the flange.

3. A damper device according to claim 1, wherein said damper main body includes a male screw on the shaft portion, said engagement projection portions being provided at one end portion of the shaft portion, and the stopper includes a female screw engaging the male screw so that when the stopper abuts against the grommet while engaging the shaft, a projecting length of the damper main body projecting from the grommet is fixed.

4. A damper device according to claim 1, further comprising an abutment projection formed on the shaft to extend in the axial direction at a portion where the engagement projection portions are provided, said abutment projection abutting against the elastic anchor piece when the shaft portion is rotated.

* * * * *